United States Patent
Hosono (10) Patent No.: US 7,130,253 B2
(45) Date of Patent: Oct. 31, 2006

(54) DISK DVD-ROM DRIVE UNIT WITH A PLAYBACK SPEED CONTROL AND DISK DRIVE METHOD

(75) Inventor: Yasushi Hosono, Sayama (JP)

(73) Assignee: TEAC Corporation (JP)

( * ) Notice: Subject to any disclaimer, the term of this patent is extended or adjusted under 35 U.S.C. 154(b) by 589 days.

(21) Appl. No.: 09/836,135

(22) Filed: Apr. 16, 2001

(65) Prior Publication Data

US 2002/0024907 A1    Feb. 28, 2002

(30) Foreign Application Priority Data

Apr. 20, 2000    (JP)    ............................. 2000-119438

(51) Int. Cl.
  *G11B 7/00*    (2006.01)
(52) U.S. Cl. ................................. 369/47.38; 369/53.21
(58) Field of Classification Search ............... 369/53.1, 369/53.2, 53.22, 53.21, 59.21, 59.22, 47.1, 369/47.37, 47.38, 53.25, 47.26, 47.46, 275.3; 714/8
See application file for complete search history.

(56) References Cited

U.S. PATENT DOCUMENTS

| | | | | |
|---|---|---|---|---|
| 5,764,610 | A * | 6/1998 | Yoshida et al. | 369/53.22 |
| 5,978,322 | A * | 11/1999 | Sugimoto et al. | 369/47.26 |
| 6,108,296 | A * | 8/2000 | Kajiyama et al. | 369/275.4 |
| 6,243,340 | B1 * | 6/2001 | Ito et al. | 369/53.19 |
| 6,430,291 | B1 * | 8/2002 | Ogino et al. | 380/203 |
| 6,530,037 | B1 * | 3/2003 | Ando et al. | 714/8 |
| 6,538,967 | B1 * | 3/2003 | Lee | 369/47.46 |
| 6,606,290 | B1 * | 8/2003 | Tosaki et al. | 369/53.21 |

FOREIGN PATENT DOCUMENTS

| | | | | |
|---|---|---|---|---|
| JP | 61-170959 | | 8/1986 | |
| JP | 3-228262 | | 10/1991 | |
| JP | 4-362569 | | 12/1992 | |
| JP | 8-077691 | | 3/1996 | |
| JP | 8-339614 | | 12/1996 | |
| JP | 11-134812 | | 5/1999 | |
| JP | 11-191282 | | 7/1999 | |
| JP | 11-306641 | | 11/1999 | |
| JP | 11-306661 | * | 11/1999 | 369/47.1 |
| JP | 11-306661 A | | 11/1999 | |
| JP | 2000-149415 | * | 5/2000 | 369/47.1 |

OTHER PUBLICATIONS

Copy of Office Action from Japanese Patent Office dated Mar. 4, 2003 citing 7 references.

* cited by examiner

*Primary Examiner*—Nabil Hindi
(74) *Attorney, Agent, or Firm*—Anderson Kill & Olick, PC (57) ABSTRACT

A disk drive unit for reproducing information recorded on a digital versatile disk (DVD). The disk drive unit has a copyright management information reading unit for reading copyright management information from a predetermined location on a DVD loaded into the disk drive unit, a first determining unit for determining whether or not protection exists for contents of the loaded DVD using the copyright management information read from the loaded DVD by the copyright management information reading unit, and a playback speed control unit for controlling a playback speed of the loaded DVD when it is determined that the contents of the loaded DVD are protected using the first determining unit.

6 Claims, 7 Drawing Sheets

DISK DVD-ROM DRIVE UNIT WITH A PLAYBACK SPEED CONTROL AND DISK DRIVE METHOD

BACKGROUND OF THE INVENTION

1. Field of the Invention

The present invention relates generally to a disk drive unit and disk drive method, and more particularly, to a disk drive unit and disk drive method for reproducing information recorded on a disk-like recording medium such as a digital versatile disk (DVD).

2. Description of the Related Art

A variety of DVDs exist, from the DVD-Video targeted for popular use in audio-visual entertainment to the DVD-R, DVD-ROM and DVD-RAM used for commercial and other data storage purposes.

The DVD-ROM drive units that read DVD-ROMs typically are able to read both DVD-Video and DVD-ROM. More recently, this type of DVD-ROM drive unit has seen advances in playback speed intended to increase the data transfer rate, until at present such devices have playback speeds up to 8 times faster than the standard speed at which DVD-Video disks are normally played.

With the conventional DVD-ROM drive unit, the loaded disk is read at maximum speed when a read command is received from an upstream device, without regard to whether the loaded disk is a DVD-ROM or a DVD-Video disk.

Such rapid read speeds pose no problem if the loaded disk is a DVD-ROM. However, if the loaded disk happens to be a DVD-Video disk, it can happen that the speed with which data is read from the disk takes place at a transfer rate exceeding that which is required by the upstream device for video and audio data reproduction, resulting in a needless increase in the consumption of electric current needed to rotate the disk.

Additionally, in general the playback time needed for DVD-Video disks is typically longer than that required for DVD-ROM, resulting in additional power consumption. If the above-described DVD-ROM drive unit is one that is installed in a laptop-type personal computer, excessive power consumption becomes a major disadvantage.

Additionally, high data transfer rates mean high disk rotation speeds, resulting in unacceptably heavy vibrations for the unit itself.

SUMMARY OF THE INVENTION

Accordingly, it is an object of the present invention to provide an improved and useful disk drive unit and disk drive method in which the above-described disadvantage is eliminated.

The above-described object of the present invention is achieved by a disk drive unit for reproducing information recorded on a digital versatile disk (DVD), the disk drive unit comprising:

a copyright management information reading unit for reading copyright management information from a predetermined location on a DVD loaded into the disk drive unit;

a first determining unit for determining whether or not protection exists for contents of the loaded DVD using the copyright management information read from the loaded DVD by the copyright management information reading unit; and a playback speed control unit for controlling a playback speed of the loaded DVD when it is determined that the contents of the loaded DVD are protected using the first determining unit.

The above-described object of the present invention is also achieved by a disk drive unit for reproducing information recorded on a digital versatile disk (DVD), the disk drive unit comprising:

a directory information reading unit for reading directory information from a predetermined location on a DVD loaded into the disk drive unit;

a second determining unit for determining whether or not computer data is recorded on the loaded DVD using the directory information read from the loaded DVD by the directory information reading unit; and a playback speed control unit for controlling a playback speed of the loaded DVD when it is determined that computer data is not recorded using the second determining unit.

The above-described object of the present invention is also achieved by a disk drive unit for reproducing information recorded on a digital versatile disk (DVD), the disk drive unit comprising:

a copyright management information reading unit for reading copyright management information from a predetermined location on a DVD loaded into the disk drive unit;

a directory information reading unit for reading directory information from a predetermined location on the loaded DVD;

a first determining unit for determining whether or not protection exists for contents of the loaded DVD using the copyright management information read from the loaded DVD by the copyright management information reading unit;

a second determining unit for determining whether or not computer data is recorded on the loaded DVD using the directory information read from the loaded DVD by the directory information reading unit; and a playback speed control unit for controlling a playback speed of the loaded DVD when it is determined that the contents of the loaded DVD are not protected using the first determining unit or when it is determined that computer data is not recorded on the loaded DVD using the second determining unit.

According to these aspects of the invention, by reducing the playback speed of the DVD the power consumed and the vibrations generated by the drive unit can be reduced.

The above-described object of the present invention is also achieved by a method for reproducing information recorded on a digital versatile disk (DVD), the method comprising the steps of:

reading copyright management information from a predetermined location on a DVD loaded into a disk drive unit;

determining whether or not protection exists for contents of the loaded DVD using the copyright management information read from the loaded DVD; and adjusting a playback speed of the loaded DVD when it is determined that the contents of the loaded DVD are protected.

The above-described object of the present invention is also achieved by a method for reproducing information recorded on a digital versatile disk (DVD), the method comprising the steps of:

reading directory information from a predetermined location on a DVD loaded into the disk drive unit;

determining whether or not computer data is recorded on the loaded DVD using the directory information read from the loaded; and adjusting a playback speed of the loaded DVD when it is determined that computer data is not recorded.

The above-described object of the present invention is also achieved by a method for reproducing information recorded on a digital versatile disk (DVD), the method comprising the steps of:

reading copyright management information from a predetermined location on a DVD loaded into the disk drive unit;

reading directory information from a predetermined location on the loaded DVD;

determining whether or not protection exists for contents of the loaded DVD using the copyright management information read from the loaded DVD;

determining whether or not computer data is recorded on the loaded DVD using the directory information read from the loaded; and adjusting a playback speed of the loaded DVD when it is determined that the contents of the loaded DVD are not protected or when it is determined that computer data is not recorded on the loaded DVD.

According to these aspects of the invention, by reducing the playback speed of the DVD the power consumed and the vibrations generated by the drive unit can be reduced.

Other objects, features and advantages of the present invention will become apparent from the following detailed description when read in conjunction with the accompanying drawings.

DETAILED DESCRIPTION OF THE INVENTION

A detailed description will now be given of a disk drive unit according to the present invention, with reference to the accompanying drawings. It should be noted that identical or corresponding elements are given identical or corresponding reference numbers in all drawings, with detailed descriptions thereof given once and thereafter omitted.

Figure 1:
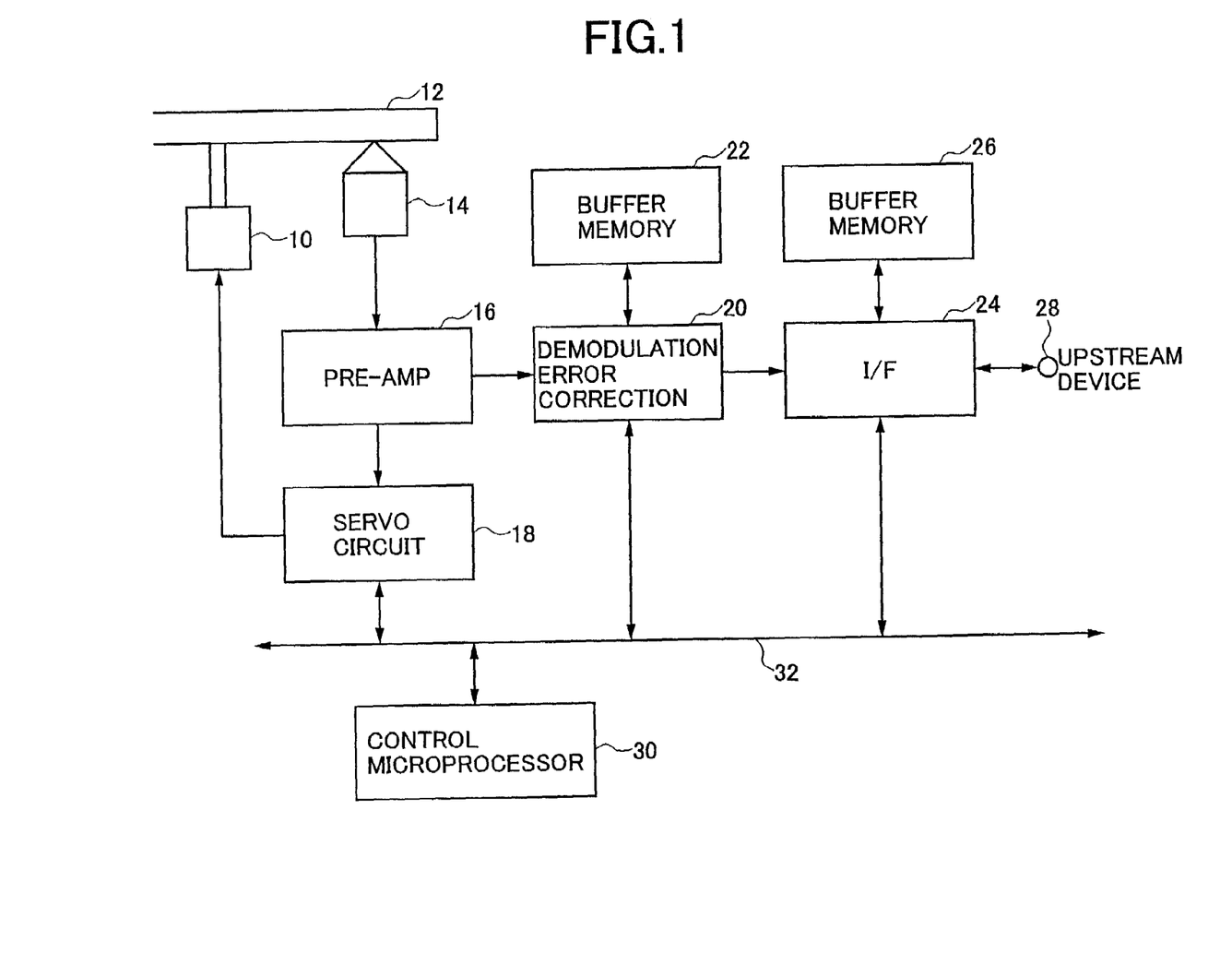
FIG. 1 is a block diagram of a disk drive unit according to one embodiment of the present invention.

FIG. 1 is a block diagram of a disk drive unit according to one embodiment of the present invention.

As shown in the diagram, a spindle motor 10 rotatable drives a DVD-Video or DVD-ROM optical disk 12 while an optical pick-up 14 is driven in a direction of a radius of the disk 12 by a thread motor not shown in the diagram. The optical pick-up 14 comprises an objective lens, an actuator, a ¼ wavelength plate, a collimator lens, a beam splitter, a laser diode and an optical sensor. A laser beam generated by the laser diode is projected onto the optical disk 12, the reflected laser beam returned by the optical disk 12 is detected by the optical sensor and the information recorded on the optical disk 12 is reproduced, that is, played back. The playback signal so obtained is then supplied to a pre-amp 16.

The pre-amp 16 is a head amp that amplifies the playback signal. This pre-amp 16 includes a matrix amp and reads out a variety of servo signals in addition to the main signal which are then supplied to a servo circuit 18. The servo circuit 18 uses these servo signals to control the rotation of the spindle motor 10. It should be noted that the speed of rotation of the spindle motor 10 is determined from the control microprocessor 30.

Additionally, the playback signals output by the pre-amp 16 are also supplied to the demodulation and error correction circuit 20. The demodulation and error correction circuit 20 uses a buffer memory 22 for RS-PC (Reed-Solomon Product Code) decoding, 8-16 demodulation and synchronization detection. The demodulated data so obtained is then transmitted to an upstream device such as a laptop personal computer and the like from a terminal 28 via an interface (I/F) 24 equipped with a buffer memory 26. It should be noted that the upstream device is equipped with an MPEG decoder.

Additionally, the demodulation data of the lead-in region of the optical disk 12 is supplied to the control microprocessor 30 via a bus 32. Further, commands transmitted from the upstream device are supplied to the control microprocessor 30 via the bus 32 from the interface 24.

A description will now be given of the physical format of the DVD, with reference to FIG. 2.

Figure 2:
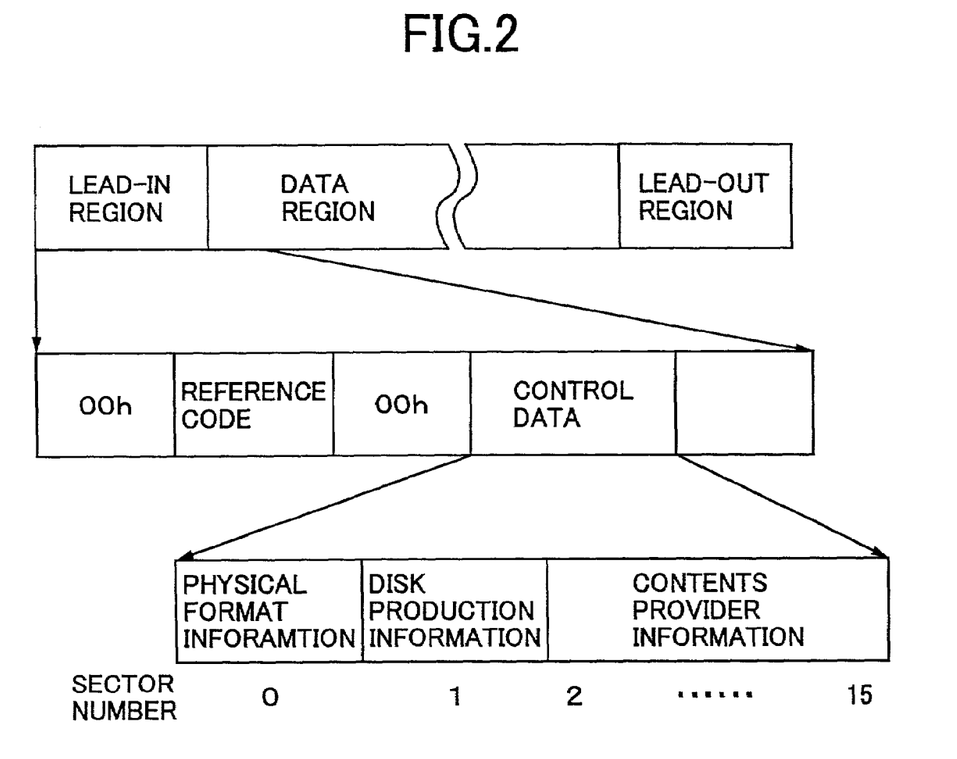
FIG. 2 is a diagram of a physical format of a DVD.

FIG. 2 is a diagram of a physical format of a DVD.

As shown in FIG. 2, the DVD information region is divided into a lead-in region, a data region and a lead-out region, with continuous sector numbers assigned to the sectors within the data region. In addition to a reference code, the lead-in region includes control data composed of 192 blocks. Sections other than these are recorded with "00h" ("h" indicating 16 bits) to be used in the future.

The control data includes physical format information, disk production information which is information concerning the production of the disk, and contents provider information. The physical format information is recorded in the relative sector number 0 position. The disk production information is recorded in the relative sector number 1 position. The contents provider information is recorded in the sector numbers 2 through 15 positions.

The contents provider information includes copyright management information (CPR_MAI). The copyright management information is based on DVD copyright protection system CSS (Content Scramble System), and contains a copyright protection system type (CPS_TY) that indicates whether or not the contents are scrambled and region management information (RMA) the indicates whether playback is possible depending on the region.

In the DVD-Video, the above-described protection for the contents restricts the unauthorized copying and reproduction of the contents. By contrast, such protection is not available for the DVD-ROM. Additionally, there are some DVD-Videos for which such protection has not been afforded. Accordingly, by reading the above-described copyright management information contents it is usually possible to determine whether the disk in question is a DVD-Video or a DVD-ROM.

A description will now be given of a DVD-ROM file management structure. The DVD-ROM file system is called UDF Bridge Format, which is a subset of UDF (Universal Disk Format), and is recorded on the disk as a combination of the ISO 9660 widely introduced as a CD-ROM standard and UDF.

A description will now be given of the ISO 9660 file structure, with reference to FIG. 3.

Figure 3:
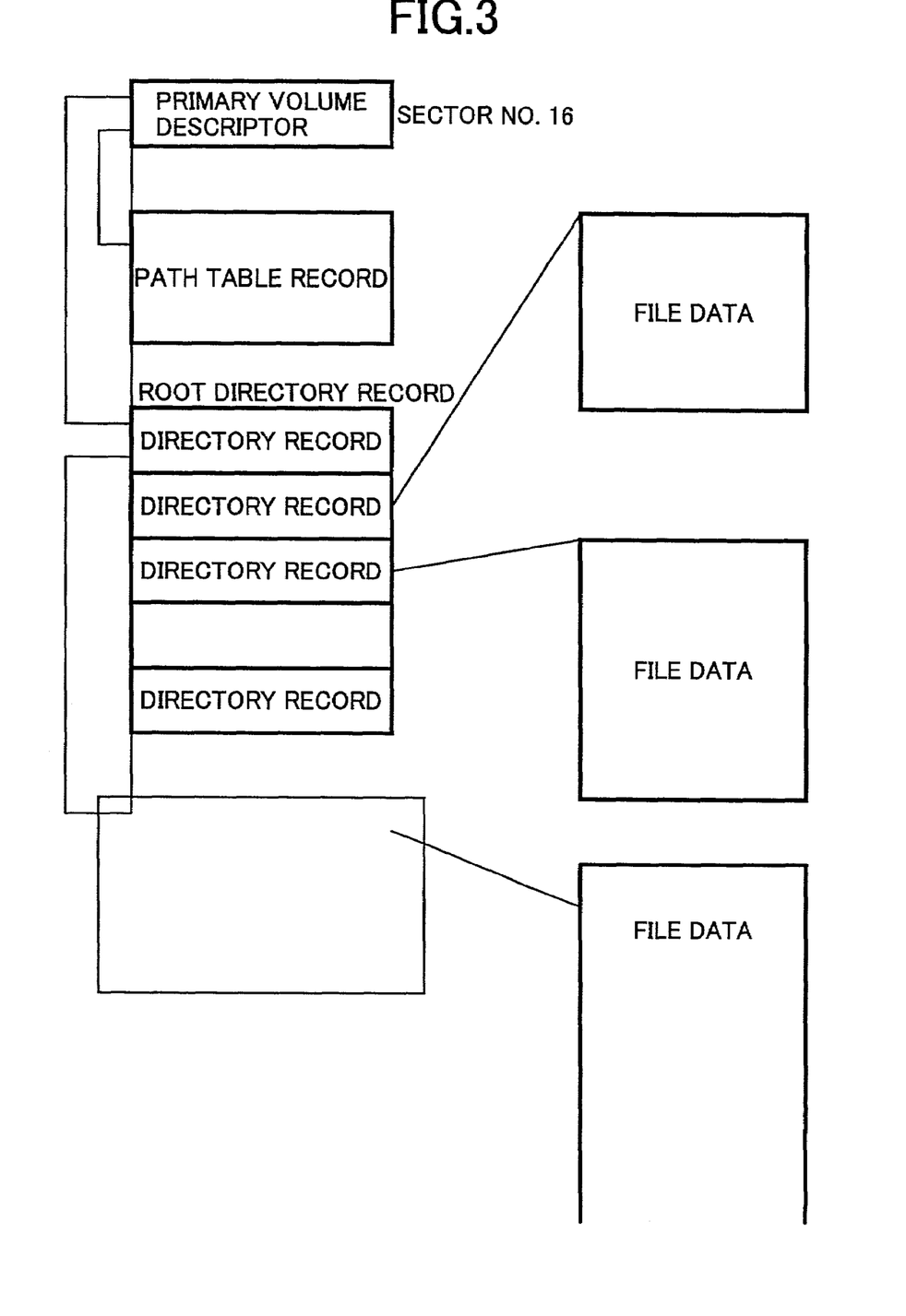
FIG. 3 is a diagram of an ISO 9660 file structure.

FIG. 3 is a diagram of an ISO 9660 file structure.

As shown in the diagram, the primary volume descriptor of the ISO 9660 is recorded in the sector with the logic sector number 16, such that by distinguishing this primary volume descriptor the ISO 9660 file system obtains information concerning the volume structure, such as the path table recording position and so forth. The ISO 9660 file structure is composed of a path table for the purpose of searching the directory and directory records which are structural elements of the directory.

Path table records relating to all the directories are recorded in the path table, so when searching for a particular directory, by searching a path table record having that directory name the position of that particular directory can be found. Location information for that file or directory is recorded in the directory record, so by searching for the corresponding file name or directory name it is possible to obtain recording location information for a particular file or directory using that directory record.

A description will now be given of the UDF file structure, with reference to FIG. 4.

Figure 4:
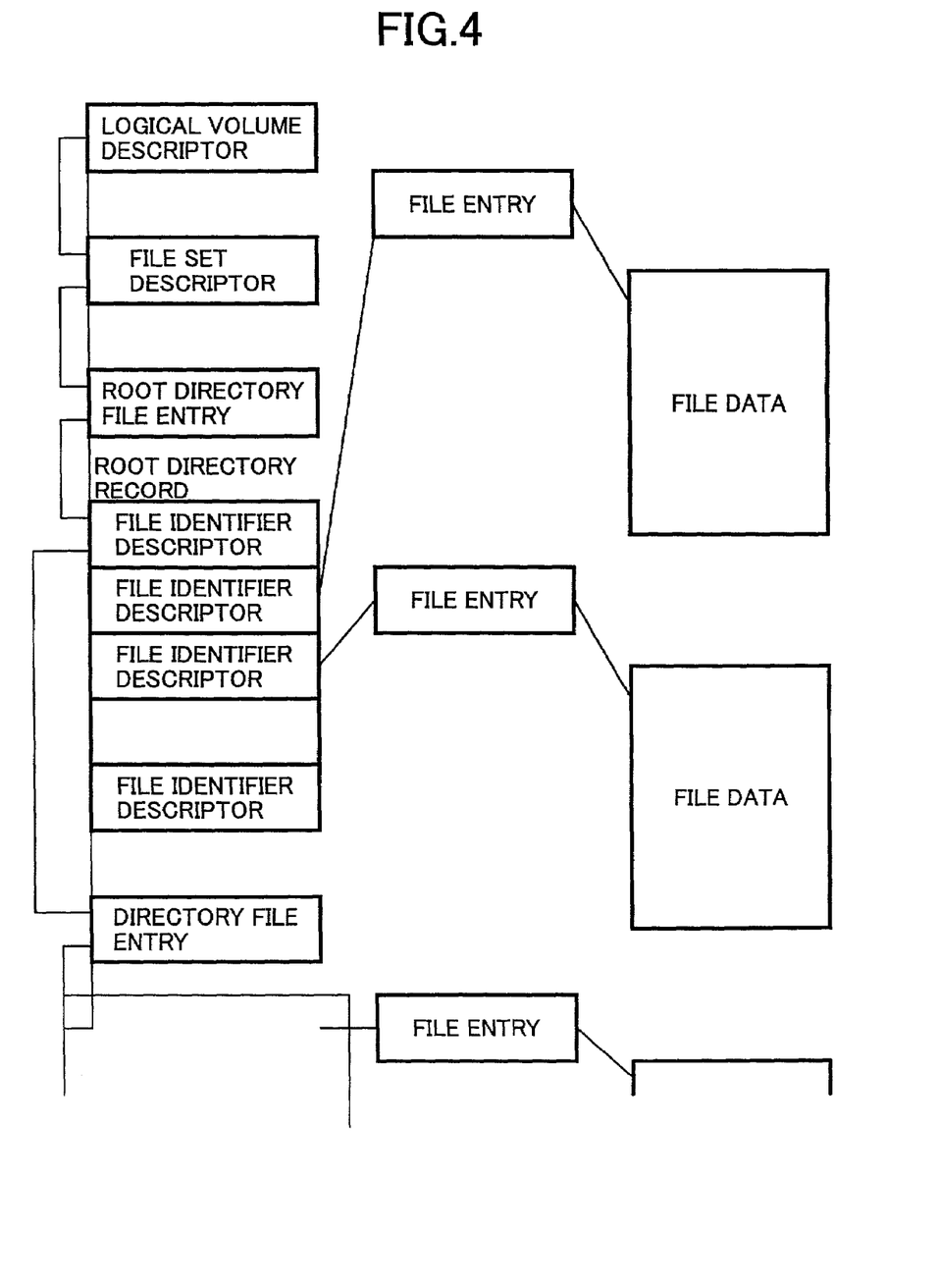
FIG. 4 is a diagram of a UDF file structure.

FIG. 4 is a diagram of a UDF file structure.

As shown in FIG. 4, a UDF file has a file set descriptor for the purpose of identifying file sets, a file identifier descriptor for identifying directory and file names, and a file entry having file attribute information and file recording location information. File set descriptor location information is recorded in the logical volume descriptor. Root directory file entry location information is recorded in the file set descriptor. The location of the root directory is recorded in this file entry. The directory is composed of file identifier descriptors related to the directories and files included in that directory.

Figure 5:
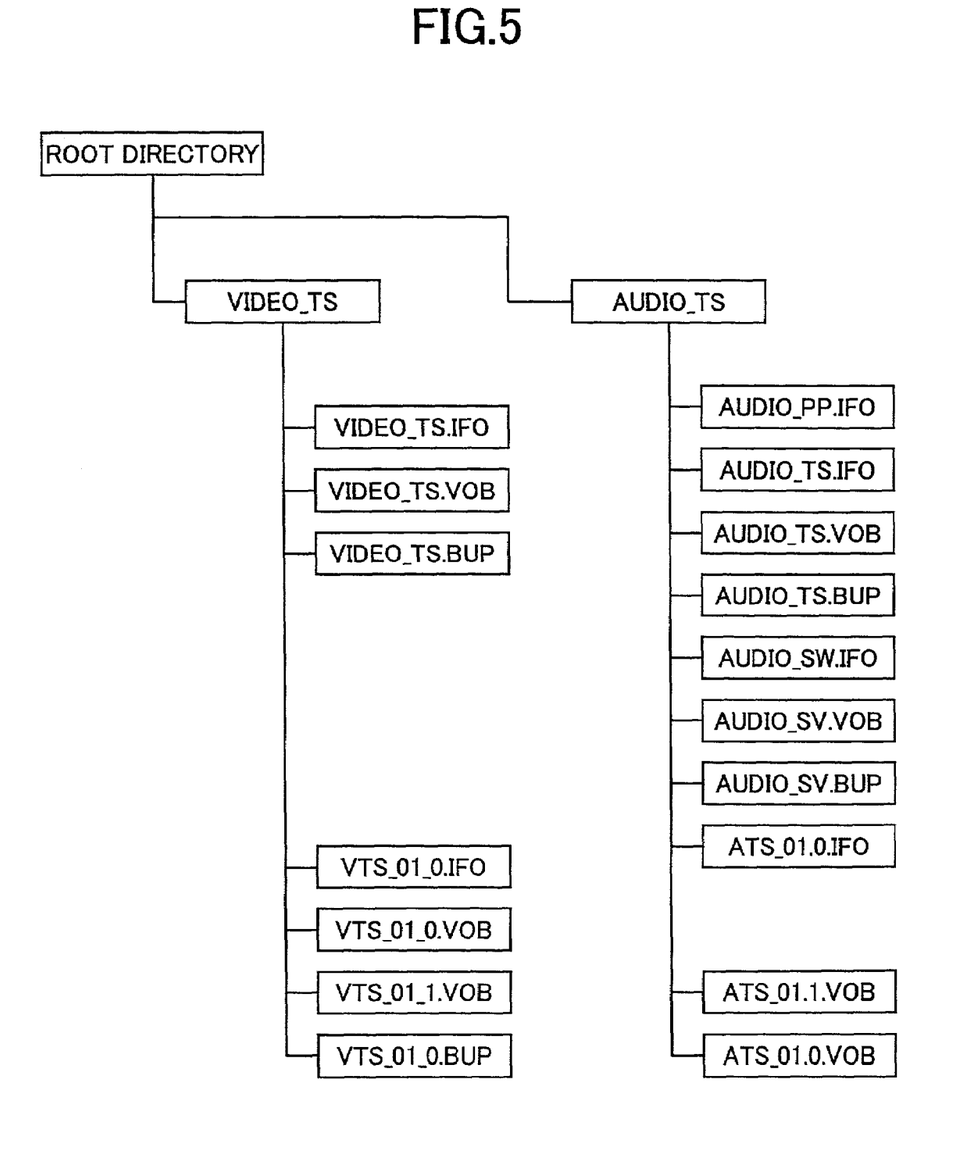
FIG. 5 is a DVD-Video directory structure.

A description will now be given of a DVD-Video directory structure.

FIG. 5 is a DVD-Video directory structure.

As shown in the diagram, the DVD-Video directory is composed of a VIDEO_TS directory directly under the root directory, an AUDIO_TS directory and a user definition directory, with the files of the file names assigned among each respective directory linked. The user definition directory is not necessary or required, and can be deleted if it is not going to be used. The typical DVD-Video usually does not have anything other than the VIDEO_TS directory and AUDIO_TS directory. By contrast, in the case of a DVD-ROM disk for which computer data is recorded, a computer data directory exists, and typically, video data exists together with the computer data, so a VIDEO_TS directory also exists.

Figure 6:
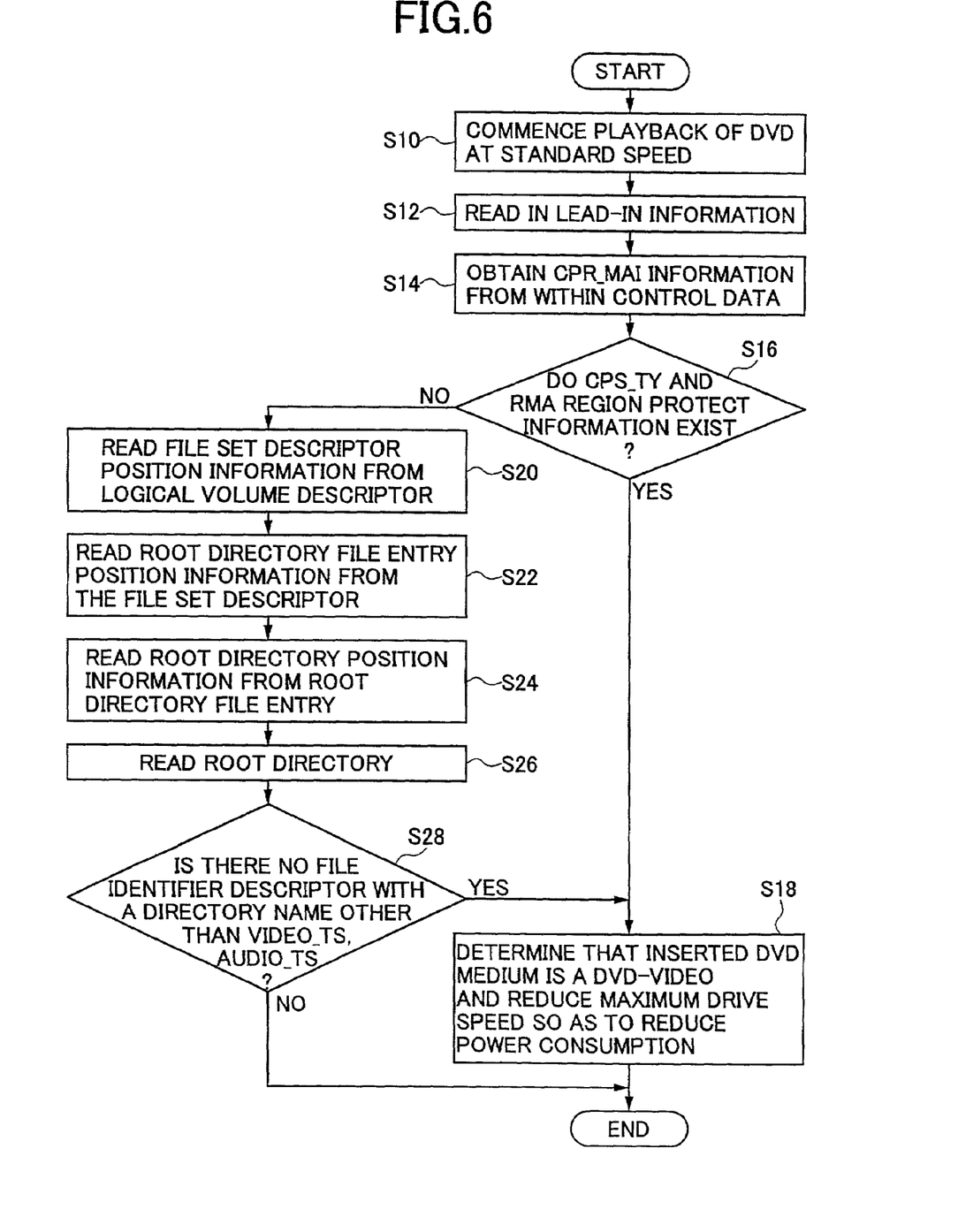
FIG. 6 is a flow chart showing steps in a process of setting a playback speed as executed by a control microprocessor according to a first embodiment of the present invention.

FIG. 6 is a flow chart showing steps in a process of setting a playback speed as executed by a control microprocessor according to a first embodiment of the present invention. This process involves determinations made in accordance with the UDF file structure, and commences with the loading of a DVD into a DVD drive unit.

As shown in the flow chart, playback of a loaded DVD commences in step S10. In step S12 the reading of lead-in information takes place. Next, in step S14, the copyright management information (CPR_MAI) within the control data of the lead-in region information shown in FIG. 2 is obtained, and in step S16 it is determined whether or not protect information exists in the region management information (RMA) and the copyright protection system type (CPS_TY) of the copyright management information.

If protect information exists, then the loaded DVD is a DVD-Video for which the contents are protected, so in step S18 the read command from the upstream device sets the playback speed to a transfer rate at which the upstream device can obtain video data. Sometimes the data is read again when there is an error in the data so read, so the playback speed is set for example at 4X. However, the playback speed may be set at 2X or at standard speed, as the case may be.

If on the other hand step S16 shows that protect information does not exist, then the loaded DVD may be a DVD-ROM and the process proceeds to step S20, in which file set descriptor position information is read from the logical volume descriptor shown in FIG. 4. In step S22 the root directory file entry position information is read from the file set descriptor. Next, in step S24 the root directory position information is read from the root directory file entry. In step S26, the root directory record is read.

Next, in step S28, it is determined whether or not a file having a file name other than VIDEO_TS or AUDIO_TS exists in the root directory record file identifier descriptor and, if such a file does exist, then the loaded DVD is determined to be a DVD-ROM and so the playback speed is not restricted and the process terminates.

If, on the other hand, a directory having a name other than VIDEO_TS or AUDIO_TS does not exist, then it is known that the loaded DVD does not have protect information for the CPS_TY, RMA, and the loaded DVD is a DVD on which no computer data has been recorded. As a result, with respect to a read command from an upstream device in step S18 the playback speed is restricted to a transfer rate that the upstream device requires in order to obtain video data and the process terminates.

As described above, if the optical disk loaded in the device is determined to be a DVD-Video and the playback speed is lowered as a result, then the information recorded on the disk is played back at a reduced speed (4X) in response to a read command from the upstream device. If the disk is a DVD-ROM then no such restriction is placed on the playback speed and the information recorded on the disk is played back at maximum speed (8X).

Figure 7:
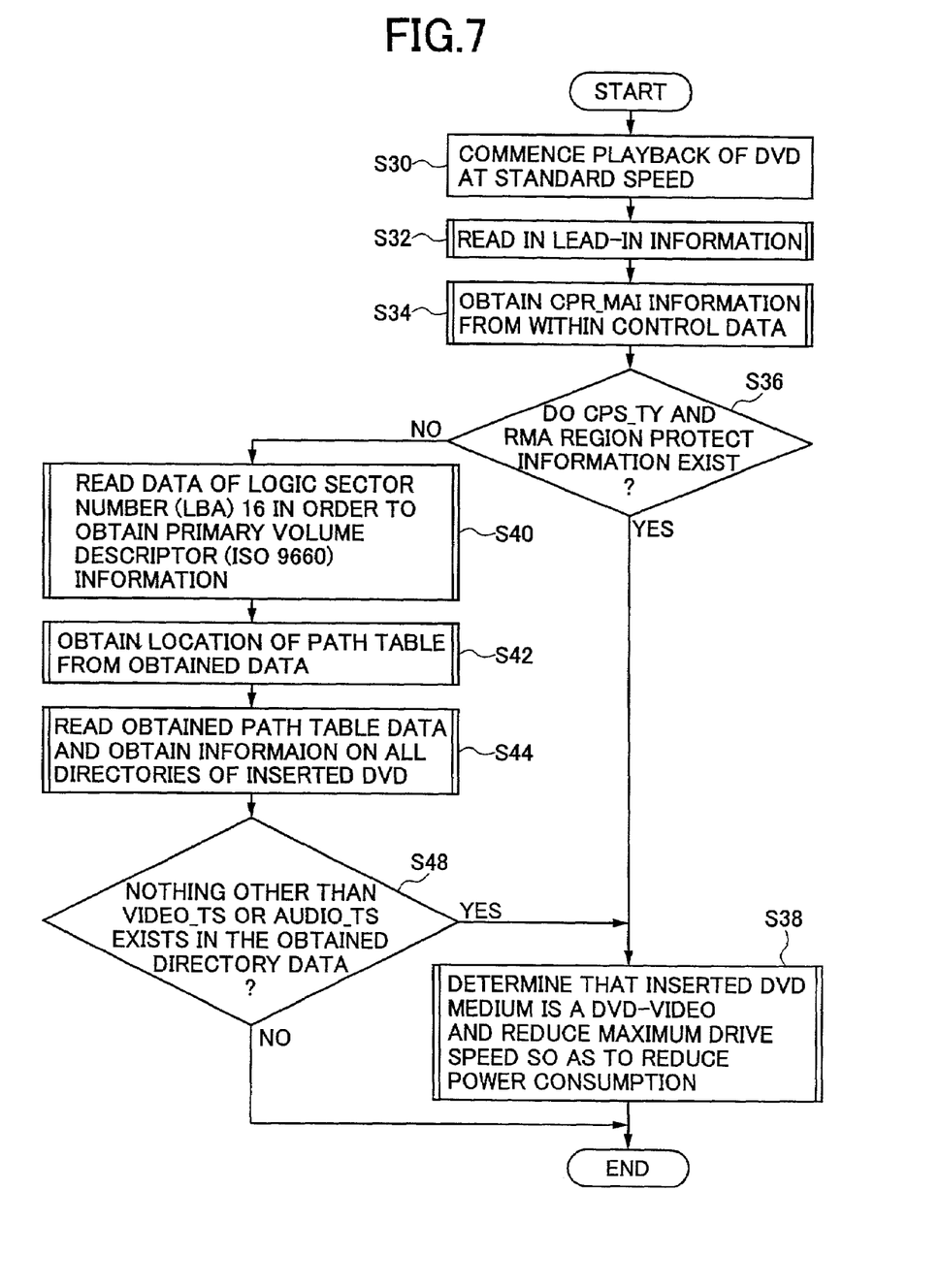
FIG. 7 is a flow chart showing steps in a process of setting a playback speed as executed by a control microprocessor according to a second embodiment of the present invention.

FIG. 7 is a flow chart showing steps in a process of setting a playback speed as executed by a control microprocessor according to a second embodiment of the present invention. This process involves determinations made in accordance with the ISO 9660 file structure, and commences with the loading of a DVD into the DVD drive unit.

As shown in the flow chart, playback of a loaded DVD commences in step S30. In step S32 the reading of lead-in information takes place. Next, in step S34, the copyright management information (CPR_MAI) within the control data of the lead-in region information shown in FIG. 2 is obtained, and in step S36 it is determined whether or not protect information exists in the region management information (RMA )and the copyright protection system type (CPS_TY) of the copyright management information.

If protection information does exist, then the loaded DVD is a DVD-Video for which the contents are protected, so in step S38 the read command from the upstream device sets the playback speed to a transfer rate at which the upstream device can obtain video data. Sometimes the data is read again when there is an error in the data so read, so the playback speed is set for example at 4X. However, the playback speed may be set at 2X or at standard speed, as the case may be.

If on the other hand step S36 shows that protect information does not exist, then the loaded DVD may be a DVD-ROM on which no computer data has been recorded and the process proceeds to step S40, in which a primary volume descriptor of a sector having logic sector number 16 as shown in FIG. 3 is read in order to find the recorded location of the path table from the data acquired in step S42. Next, step S44 the path table data is read in order to find the names of all the directories on the loaded DVD.

Next, in step S48 it is determined whether or not a directory having a name other than VIDEO_TS or AUDIO_TS exists among the names of all the directories, and if so, then the loaded DVD is determined to be a DVD-ROM and playback speed is not reduced and the process terminates.

If, on the other hand, a directory having a name other than VIDEO_TS or AUDIO_TS does not exist, then it is known that the loaded DVD does not have protect information for the CPS_TY, RMA, and the loaded DVD is a DVD on which no computer data has been recorded. As a result, with respect to a read command from an upstream device in step S38 the playback speed is restricted to a transfer rate that the upstream device requires in order to obtain video data and the process terminates.

As described above, if the optical disk loaded in the device is determined to be a DVD-Video and the playback speed is lowered as a result, then the information recorded on the disk is played back at a reduced speed (4X) in response to a read command from the upstream device. If the disk is a DVD-ROM then no such restriction is placed on the playback speed and the information recorded on the disk is played back at maximum speed (8X).

Thus, as described above, the playback speed of the digital versatile disk loaded in the drive unit according to the present invention is reduced whenever it is determined that the contents are not protected or that computer data has not been recorded, thus making it possible to determine with reliability that the loaded disk is a DVD-Video. Additionally, by reducing the DVD-Video playback speed, the power consumed and the vibrations generated by the unit can be reliably reduced.

It should be noted that steps S10 through S14 and steps S30 through S34 correspond to the copyright management information reading unit, steps S16 and S36 correspond to the first determining means, steps S18 and S38 correspond to the playback speed control unit, steps S20 through S26 and S40 through S44 correspond to the directory information reading means and steps S28 and S48 correspond to the second determining means of the claims.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 2000-119438 filed on Apr. 20, 2000, the contents of which are hereby incorporated by reference.

What is claimed is:

1. A disk drive unit for reproducing information recorded on a digital versatile disk (DVD), the disk drive unit comprising:
   a copyright management information reading unit for reading copyright management information from a predetermined location on a DVD loaded into the disk drive unit;
   a first determining unit for determining whether or not protection exists for contents of the loaded DVD using the copyright management information read from the loaded DVD by the copyright management information reading unit; and
   a playback speed control unit for adjusting a playback speed of the loaded DVD to a transfer rate at which an upstream device can obtain video data, when it is determined that the contents of the loaded DVD are protected using the first determining unit and to a substantially different playback speed when it is determined that the contents of the loaded DVD is not protected.

2. A disk drive unit for reproducing information recorded on a digital versatile disk (DVD), the disk drive unit comprising:
   a directory information reading unit for reading directory information recorded by a file system of IS09660 or UDF from a DVD loaded into the disk drive unit;
   a second determining unit for determining whether or not the DVD is a DVD-Video by determining if the designated directory name of VIDEO TS or AUDIO TS is recorded on the loaded DVD using the directory information read from the loaded DVD by the directory information reading unit and for determining if any other directory names are recorded along with the recording of VIDEO TS or AUDIO TS; and
   a playback speed control unit for adjusting a playback speed of the loaded DVD in response to the determination by said second determining unit that the DVD is a DVD-Video and upon the determination that the designated directory name of VIDEO TS or AUDIO TS was recorded alone without any other directory name.

3. A disk drive unit for reproducing information recorded on a digital versatile disk (DVD), the disk drive unit comprising:
   a copyright management information reading unit for reading copyright management information from a predetermined location on a DVD loaded into the disk drive unit;
   a directory information reading unit for reading directory information from a predetermined location on the loaded DVD;
   a first determining unit for determining whether or not protection exists for contents of the loaded DVD using the copyright management information read from the loaded DVD by the copyright management information reading unit;
   a second determining unit for determining whether or not computer data is recorded on the loaded DVD using the directory information read from the loaded DVD by the directory information reading unit; and
   a playback speed control unit for adjusting a playback speed of the loaded DVD when it is determined that the contents of the loaded DVD are not protected using the first determining unit or when it is determined that computer data is not recorded on the loaded DVD using the second determining unit.

4. A method for reproducing information recorded on a digital versatile disk (DVD), the method comprising the steps of:
   reading copyright management information from a predetermined location on a DVD loaded into a disk drive unit;
   determining whether or not protection exists for contents of the loaded DVD using the copyright management information read from the loaded DVD; and
   adjusting a playback speed of the loaded DVD to a transfer rate at which an upstream device can obtain video data, when it is determined that the contents of the loaded DVD are protected and to a substantially different playback speed when it is determined that the contents of the loaded DVD is not protected.

5. A method for reproducing information recorded on a digital versatile disk (DVD), the method comprising the steps of:
reading directory information including directory names recorded by a file system of ISO9660 or UDF from a DVD loaded into the disk drive unit;
using the directory information read from the loaded DVD to determine whether or not the DVD is a DVD-Video by determining if the designated directory name of VIDEO TS or AUDIO TS is recorded and for determining if any other directory names are recorded along with the recording of VIDEO TS or AUDIO TS; and
adjusting a playback speed of the loaded DVD in response to the determination by said second determining unit that the DVD is a DVD-Video and that the designated directory name of VIDEO TS or AUDIO TS was recorded alone without any other directory name.

6. A method for reproducing information recorded on a digital versatile disk (DVD), the method comprising the steps of:
reading copyright management information from a predetermined location on a DVD loaded into the disk drive unit;
reading directory information from a predetermined location on the loaded DVD;
determining whether or not protection exists for contents of the loaded DVD using the copyright management information read from the loaded DVD;
determining whether or not computer data is recorded on the loaded DVD using the directory information read from the loaded; and
adjusting a playback speed of the loaded DVD when it is determined that the contents of the loaded DVD are not protected or when it is determined that computer data is not recorded on the loaded DVD.

* * * * *